United States Patent [19]

Van Mastrigt

[11] 4,163,126
[45] Jul. 31, 1979

[54] TENSION INDICATING DEVICE
[75] Inventor: Max Van Mastrigt, Tarzana, Calif.
[73] Assignee: W. C. Dillon and Co. Inc., Van Nuys, Calif.
[21] Appl. No.: 885,000
[22] Filed: Mar. 9, 1978
[51] Int. Cl.² .......................................... B65H 25/14
[52] U.S. Cl. ............................................... 200/61.13
[58] Field of Search ............. 200/61.13, 61.14, 61.18, 200/153 T, 161, 153 F, 47; 242/148, 153, 154; 254/173 R; 212/2, 39 R; 340/668

[56] References Cited
U.S. PATENT DOCUMENTS

| | | | |
|---|---|---|---|
| 2,355,634 | 8/1944 | Doughty, Jr. | 200/153 T X |
| 2,357,675 | 9/1944 | McCord | 200/61.18 |
| 2,372,162 | 3/1945 | Ryan | 200/61.13 X |
| 2,487,187 | 11/1949 | Seifried et al. | 200/61.18 |
| 2,680,842 | 6/1954 | Opphile | 200/61.14 X |
| 3,227,833 | 1/1966 | Davies et al. | 200/61.18 X |
| 3,278,925 | 10/1966 | Saunders et al. | 340/668 |
| 3,587,959 | 6/1971 | Glover | 200/61.18 X |
| 3,599,368 | 8/1971 | Riley | 200/61.13 X |

Primary Examiner—James R. Scott
Attorney, Agent, or Firm—Ralph B. Pastoriza

[57] ABSTRACT

The device includes a rigid frame supporting tandem pulleys for engaging spaced points on a rope or cable in which a predetermined tension when reached is to be indicated. The center of the rope between the pulleys is laterally displaced from a tangent line between the spaced points on the pulleys and secured to a bending beam so that when tension is applied to the rope the secured center portion will tend to move into alignment with the engagement points on the pulley thereby deflecting the beam. A microswitch secured to the frame is arranged to be engaged when the beam has been deflected a predetermined amount thereby indicating when a predetermined tension has been reached.

10 Claims, 6 Drawing Figures

TENSION INDICATING DEVICE

This invention relates generally to devices for indicating tension in ropes, cables and the like and more particularly to a portable device of the foregoing type which can be readily attached to a cable without requiring access to the ends of the cable.

BACKGROUND OF THE INVENTION

Tension indicating devices, in general, are well known and utilized in a variety of applications. The simplest form of such devices is designed merely to indicate when a predetermined tension has been reached as opposed to providing continuous tension readings. Such devices, for example, find use for attachment to cables in cranes so that a warning to a crane operator will be provided if a load to be lifted creates a tension in the cable greater than a predetermined or unsafe value.

Some of the known prior art tension indicating devices require feeding of an end of the cable through the device in order to attach the device to the cable. In large crane structures utilizing multiple cables, such a procedure for attachment can be time consuming and costly since the cable has to be disassembled from the crane. While tension devices are known which are designed to be attached to a cable without access to the ends of the cable, other problems arise, principally the problem of realizing consistent indications when the tension in the rope or cable changes from a low value, through a predetermined value to a high value and from a high value through a predetermined value to a low value. To provide consistency has resulted in fairly complicated indicating structures.

More particularly, prior art tension indicators of the type under consideration in the present invention utilize a frame having a three point contact with a portion of the rope or cable, the center point being laterally displaced to be out of alignment with the other two points so that when tension is applied in the rope or cable a component of the tension force acts at the center point tending to bring it into alignment with the other two points. Movement of this center point is restrained by a resilient means so that by measuring the physical deflection, an indication of tension is provided. The inconsistency in readings as described heretofore resides in the "hysteresis" characteristic of the resilient means opposing the deflection and, as mentioned, considerable structural sophistication has been provided to minimize this hysteresis. The overall result has been that while tension indicating devices are available, they are relatively expensive and complicated in construction and still leave much to be desired in providing consistent and accurate indications.

BRIEF DESCRIPTION OF THE PRESENT INVENTION

Bearing the foregoing in mind, the present invention contemplates a greatly improved tension indicating device of the type which can be readily attached to a portion of a rope or cable without need of access to the ends of the cable and which is so designed that consistency within an acceptable degree of accuracy of tension indications is assured whether the tension is increasing through the predetermined value to be indicated or decreasing through this value.

More particularly, in accord with this invention complicated resilient means for opposing deflection as heretofore employed are replaced by a single bending beam means mounted in a unique manner to overcome the above discussed problems with prior art devices.

For convenience in terminology throughout the description of the present invention and in the appended claims, the term "rope" will be consistently used to indicate a conventional rope, wire type rope, or cable or equivalent line in which a tension is to be indicated. Accordingly, in its broadest aspect, the device of this invention includes a frame having spaced rope guide means for engaging spaced points on the rope; means for securement to a portion of the rope between the spaced points and laterally displaced from a straight line between the spaced points so that the portions of rope extending in generally opposite directions from the point of securement define an angle with each other less than 180°; bending beam means secured between said means for securement to a portion of the rope and the frame so that increased tension in the rope will deflect the bending beam means; and, indicating means on the frame responsive to deflection of the bending beam means a predetermined amount defined by the predetermined value of tension to be indicated.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
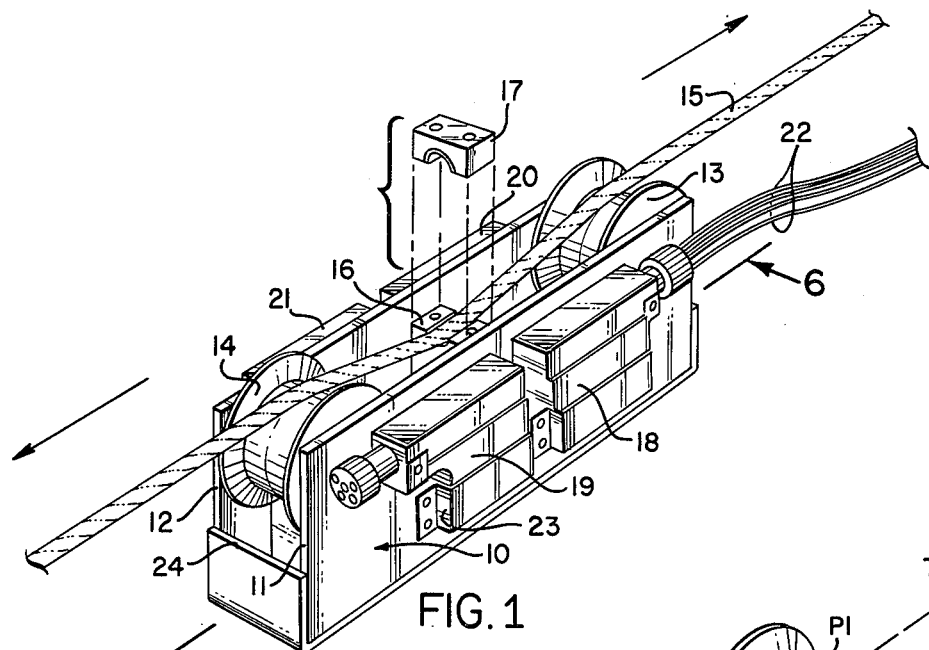
FIG. 1 is an overall perspective view of the preferred embodiment of the tension indicating device of this invention.

Referring first to FIG. 1, the device includes a rigid frame designated generally by the numeral 10 comprised of two spaced parallel rectangular plates 11 and 12 facing each other as shown. Rope guide means in the form of first and second guide pulleys 13 and 14 are rotatably mounted in tandem relationship between opposed corner portions at opposite ends of the plates 11 and 12 as shown. In the view of FIG. 1, the upper portion of the pulleys are exposed for engaging spaced points of a rope indicated at 15 without requiring access to the ends of the rope.

A securing block 16 is arranged to be secured to a mid portion of the rope 15 between the spaced points of engagement with the pulleys 13 and 14. In this respect, there is provided a bridging clamp 17 to clamp the rope to the block 16 all as will become clearer as the description proceeds.

The point of securement of the mid portion of the rope between the pulleys is laterally displaced from a tangent line between the engagement points of the rope with the pulley as illustrated in FIG. 1 so that tension in the rope 15 will exert an upward pull on the securing block 16.

As will become clearer subsequently, the securing block 16 connects to a bending beam between the rectangular frame plates 11 and 12 resulting in a deflection. Microswitches indicated generally at 18, 19, 20 and 21 are secured to the exterior sides of the plates 11 and 12 in positions such that they will be successively operated in response to deflection of the bending beam. Output leads 22 are illustrated for the microswitch 18 which leads would connect to a remote indicator in a crane cab for example to advise the operator that a predetermined tension in the rope 15 had been reached.

Four such microswitches are illustrated in FIG. 1, but it should be understood that the device need only be provided with one microswitch in the event it is only desired to indicate one predetermined tension existing in the rope.

In the embodiment as illustrated in FIG. 1, various components of the device are protected by appropriate cover plates such as indicated at 23 for portions of the microswitch 19, and 24 passing from the ends of the frame plates 11 and 12 along the bottom edges thereof.

Figure 2:
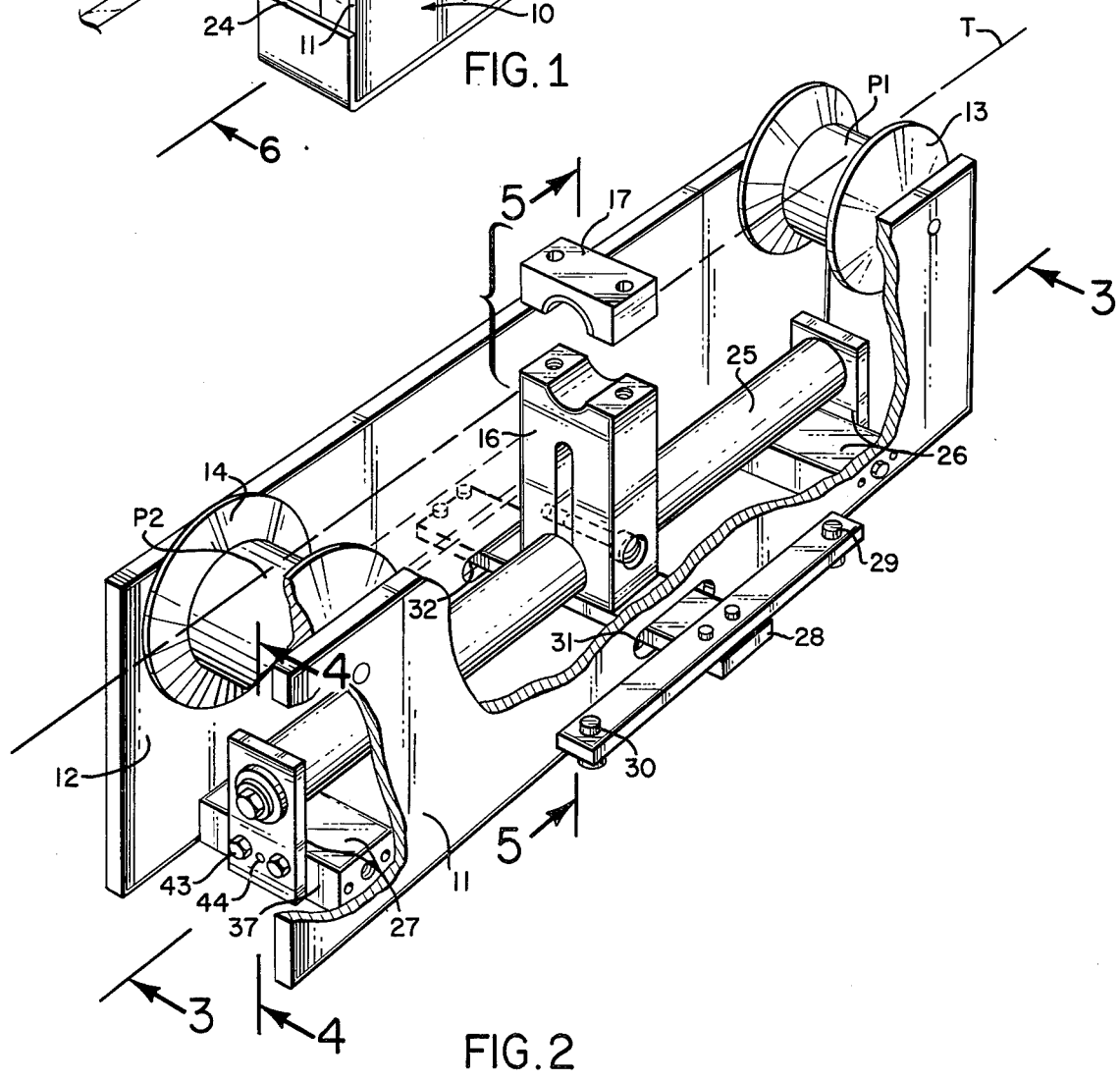
FIG. 2 is an enlarged cut-away view of the device of FIG. 1 with certain components removed for ease of illustration.

Referring now to the enlarged view of the inner portions of the device illustrated in FIG. 2, the bending beam referred to in FIG. 1 is illustrated at 25 and preferably takes the form of an elongated cylindrical solid rod of aluminum. This beam runs parallel to and in spaced relationship from a straight tangent line to the spaced points of engagement of the rope by the pulleys 13 and 14. In FIG. 2, these spaced points are indicated at P1 and P2 and the tangent line is indicated at T.

Appropriate end mounts for the bending beam 25 are illustrated generally at 26 and 27 and serve to secure the ends of the beam to opposed longitudinal edge portions of the frame plates 11 and 12 adjacent to the remaining corners below the pulleys at the referred to opposite end portions of the frame.

In FIG. 2, the securing block 16 is clearly illustrated fixed to a mid point of the bending beam 25, this mid point being equidistant from the spaced points P1 and P2. A microswitch engaging means is secured to the block 16 and may comprise, for example, a laterally extending bar 28 fixed to the bottom of the securing block 16 to pass through the exterior of the frame plates 11 and 12, the extending ends of the bar 28 supporting microswitch engaging projections 29 and 30. Appropriate sized openings 31 and 32 are provided in the rectangular frame plates 11 and 12 respectively for passage of the bar 28 therethrough in non-contacting relationship. The dimensioning of the openings 31 and 32 is such that the bar 28 can move upwardly through the maximum deflection contemplated on the bending beam 25 with the securing block 16 without making physical engagement with the upper edge of the openings. However, should bending of the beam 25 exceed a designed amount, engagement of the bar 28 with the upper portions of these openings will serve as a stop and protect against damage to the bending beam.

Figure 3:
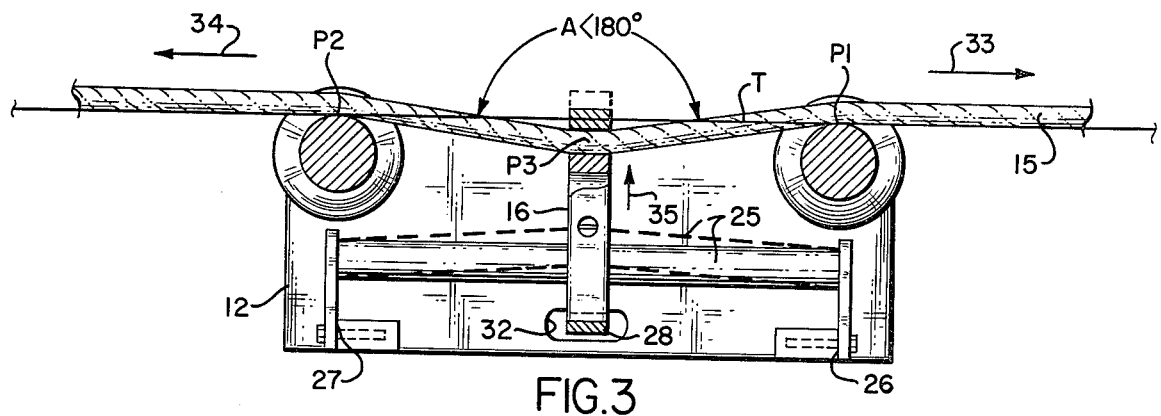
FIG. 3 is a cross section taken in the direction of the arrows 3—3 of FIG. 2.

Referring now to FIG. 3, the lateral displacement of the point of securement of the securing block 16 to the rope 15 at a point designated P3 is clearly illustrated. Thus, it will be evident that this mid point P3 lies between the tangent line T and the beam 25 so that the angle between portions of the rope extending from its mid point to the spaced points P1 and P2 designated A in FIG. 3 is less than 180°.

In FIG. 3 there is indicated by the arrows 33 and 34 in opposite directions a tension applied to the rope 15. This tension will generate a force component in an upward direction of the securing block 16 as indicated by the arrow 35, which force component in turn will tend to deflect the bending beam 25 all as indicated in phantom lines.

Because deflection of the mid portion of the bending beam 25 will move the opposite ends of the beam towards each other, the end mounts 26 and 27 are specifically designed in accord with the present invention to accommodate such slight movement. Since both of these end mounts are identical, a detailed description of one will suffice.

Figure 4:
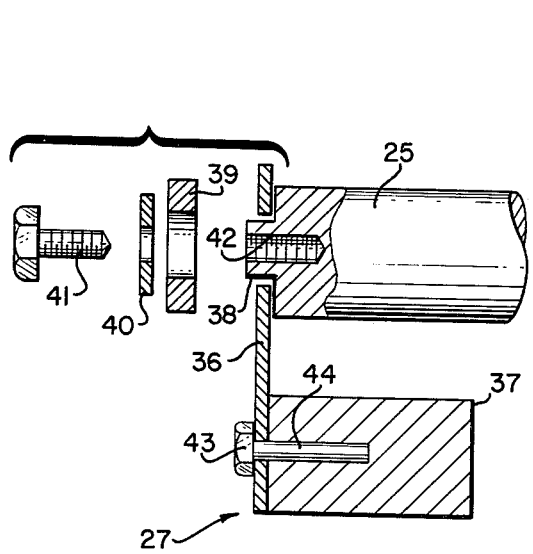
FIG. 4 is a fragmentary exploded view partly in cross section taken in the direction of the arrows 4—4 of FIG. 2.

Thus, the end mount 27 as illustrated in FIG. 4 includes a flexure web 36 lying in a plane normal to the axis of the beam 25, the upper portion of the web 36 being secured to the end of the beam 25 and the lower portion being secured as described in FIG. 2 to the frame plates as by means of a block 37.

The securement of the end of the beam 25 to the upper portion of the flexure web 36 is an important consideration in that any relative movement or slippage would affect the deflection of the beam. Accordingly, to establish a proper end securement to the beam 25 there is provided a reduced diameter integrally formed annular shoulder 38 from the end of the beam arranged to pass through a central opening in the upper portion of the flexure 36 as shown. A washer 39 then passes over the extending portion of the projection 38 to engage the back side of the flexure 36 over 360°. A second washer 40, in turn, seats on the opposed face of the washer 39 and a fastening bolt 41 extends through the washers into a tapped opening 42 in the beam 25. Seating pressure is thus applied through the large diameter washer 39 over a substantial area of the end face of the beam 25 by the bolt 41 to provide the desired securement.

It will be noted with respect to the foregoing that the large washer 39 is of greater thickness than the extent of protrusion of the projection 38 from the outside of the flexure 36 so that the pressure applied against the end face of the beam 25 is entirely through the large washer 39 and is not against the end of the projection portion 38.

Also illustrated in FIG. 4 with respect to the securement of the lower portion of the flexure web 36 is a bolt 43 and a roll bar 44 extending into the block 37. Actually, and as will be evident from FIG. 2, there are provided two bolts 43 on either side of the roll bar 44 so that any rotation of the flexure web 36 in its own plane; that is, into or out of the plane of the drawing of FIG. 4 is prevented by the fastening bolts.

With reference once again to FIG. 2, the ends of the block 37 are similarly secured to the frame plates 11 and 12 two roll bars being provided on either side of a central fastening bolt.

It will be understood that under the above described conditions of securement, when the bending beam 25 is deflected at its mid point, the flexure web 36 will accommodate the movement of the ends of the beam towards each other as well as the tilting of the plane of the end surfaces of the beam 25.

Figure 5:
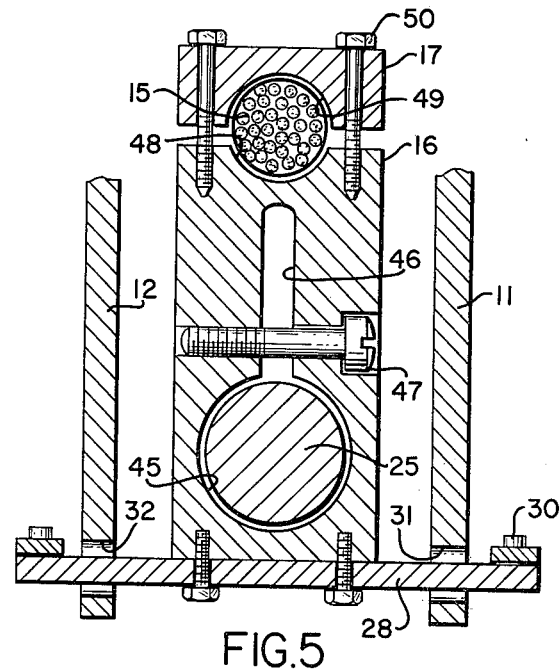
FIG. 5 is a fragmentary cross section taken in the direction of the arrows 5—5 of FIG. 2; and, FIG. 6 is a side elevational view looking in the direction of the arrows 6—6 of FIG. 1 wherein cover plates have been removed to expose various components.

Referring now to FIG. 5, further details of the securing block 16 will be evident. In the specific embodiment disclosed, this securing block 16 includes a central opening 45 through which the bending beam 25 passes. A radial slot 46 extends from a peripheral point of this opening away therefrom to terminate short of the end of the block as shown. A bolt 47, in turn, traverses the slot as indicated so that tightening of the bolt circumferentially contracts the central opening 45 to tightly engage the cylindrical bar. The end entrance and exit edges of the central opening 45 are preferably bevelled outwardly slightly as indicated in the drawing of FIG. 5 to avoid a "cutting" into the beam 25 under deflection.

Referring now to the upper portion of the securing block 16 as shown in FIG. 5, the top end thereof defines a cradle structure in the form of a concave depression 48 receiving the rope 15. The bridging clamp 17 described heretofore similarly includes a concave depression 49 opposing the depression 48 when the bridging clamp 17 is positioned over the rope 15. Appropriate fastening screws such as indicated at 50 securely clamp the bridging clamp 17 to the securing block 16. The entrance and exit edges of the concave depression 49 in the bridging clamp are preferably bevelled in order to avoid any cutting of the rope 15 passing thereunder.

FIG. 5 further illustrates in its lower portion the microswitch engaging support bar 28 secured to the bottom of the securing block 16 and passing through the opposite openings 31 and 32 in the frame plates 11 and 12, sufficient clearance being provided to accommodate upward and downward movement of the securing block 16 under various tensions applied to the rope.

Figure 6:
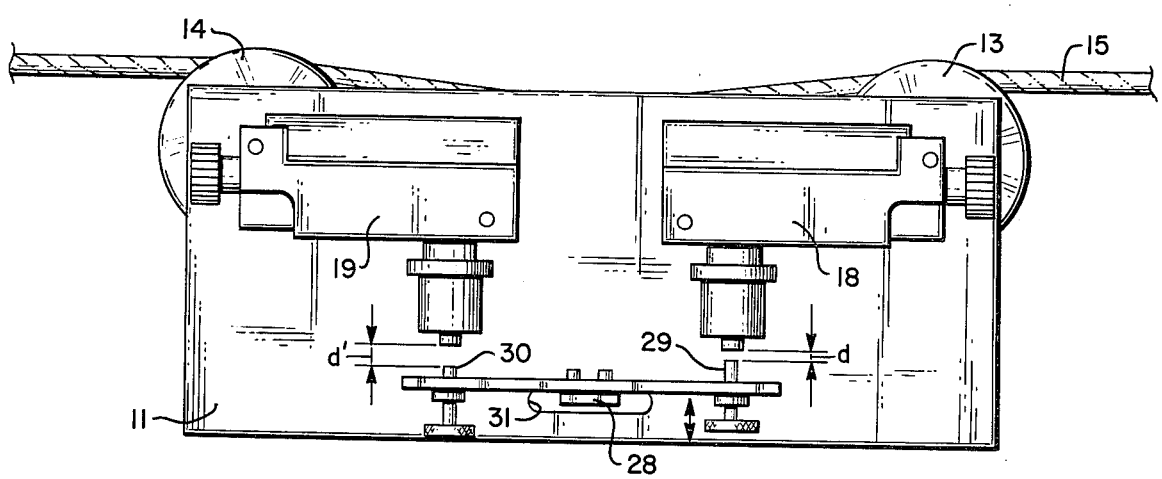

Referring now to FIG. 6, there is illustrated in detail two of the microswitches 18 and 19 wherein it will be noted that the contact portions for operation of the microswitches are respectively at given spacings designated d and d' respectively from the microswitch engaging projections 29 and 30 carried on the bar 28. These given spacings or distances are predetermined prior to any deflection of the bending beam; that is, when there is zero tension on the cable as by threading the appropriate projections 29 and 30 closer to or further from the actuating buttons of the microswitches.

It can be appreciated from the positioning of the components as shown in FIG. 6 that when the bending beam deflects to cause upward movement of the securing block 16 and thus the bar 28, the projections 29 and 30 will move closer to the microswitch contacts; that is, any predetermined given distances or spacings will be decreased. Further, because of the characteristics of the bending beam, the amount of deflection thereof and thus the amount the distances d and d' are decreased, is a function of the tension in the rope 15.

Accordingly, it is a simple matter to calibrate the appropriate spacing for example the given spacing d such that engagement and operation of the microswitch 18 will occur when a predetermined tension value exists in the rope 15. Similarly the spacing d' which is illustrated as greater for the operation of the microswitch 19 in FIG. 6 can be adjusted such that this second microswitch 19 will be operated when a greater tension value is reached.

It will be further appreciated that the remaining microswitches described in FIG. 1 on the opposite side of the device can similarly be individually adjusted.

It will be understood that the operating buttons for the microswitch after making switch contact to operate the microswitch are free to move further into the switch so that successive operation of the microswitches can be achieved upon successive tension values being reached.

As a typical example of an operative device of this invention, the bending beam 25 would constitute a solid aluminum cylindrical rod of length between the flexure mounts of 228.6 mm. and an outside diameter of 21.4 mm. For an angle A as described in FIG. 3, between the oppositely extending portions of the rope 15 from the mid point securement P3 of 168°, a tension force of 5,000 pounds in the rope would be sufficient to effect operation of one of the microswitches for an intermediate spacing d of the microswitch engaging projection or contact.

Predetermined tension values above or below 5,000 pounds in the rope could similarly be indicated by appropriate adjustment of the spacing between the microswitch engaging means and the microswitches.

The overall length of the rectangular frame plates 11 and 12 might typically be 270 mm and the width between the lower and upper longitudinal edges of these plates about 105 mm. The spacing between the rectangular plates would typically be about 50 mm.

From the foregoing, it will be appreciated that the tension indicating device of this invention is of fairly compact size and easily portable. Moreover, it can readily be applied to any portion of a rope or cable without access to the ends of the rope.

The mounting of the bending beam and the use of the bending beam itself has resulted in surprisingly consistent readings within acceptable accuracies whether the tension is passing through predetermined tension points in an upward or downward direction; in other words, hysteresis effects are kept at a minimum.

Various changes in the actual construction falling within the scope and spirit of this invention, will, of course, occur to those skilled in the art. The tension indicating device is thus not to be thought of as limited specifically to the particular embodiment described.

I claim:

1. A device for indicating when a tension in a rope has reached a predetermined value, including, in combination:
   (a) a rigid frame having spaced rope guide means for engaging spaced points on the same side of said rope;
   (b) means securing a portion of said rope between said spaced points and laterally displaced from a straight line between said spaced points so that the portions of rope extending generally in opposite directions from the point of securement define an angle with each other less than 180°;
   (c) elongated bending beam means secured at one portion to said means securing a portion of said rope and said frame and at another portion to said rigid frame so that increased tension in said rope will deflect said bending beam means; and
   (d) indicating means on said frame responsive to deflection of said bending beam means a predetermined amount defined by said predetermined value of tension.

2. A device according to claim 1, in which said indicating means includes at least one microswitch secured to said frame, said means securing a portion of said rope including microswitch engaging means at a given distance from said microswitch when said bending beam means is undeflected, deflection of said bending beam means decreasing said given distance.

3. A device according to claim 2, in which said microswitch engaging means includes means for changing said given distance.

4. A device for indicating when tension in a rope has reached a predetermined value, including in combination:
(a) a rigid frame;
(b) first and second guide pulleys rotatably mounted in tandem relationship to opposite ends of said frame respectively with exposed pulley portions for engaging spaced points on said rope without requiring access to the ends of the rope;
(c) a bending beam running parallel to and in spaced relationship from a straight tangent line to said spaced points;
(d) end mounts for said bending beam to secure the ends thereof to said frame, the mid point of said beam being equidistant from said spaced points;
(e) a securing block fixed to the mid point of said beam and having a rope receiving cradle structure for securement to the mid point of said rope between said spaced points, said mid point being between said tangent line and beam so that the angle between portions of the rope extending from its mid point to said spaced points of engagement with said pulleys is less than 180°;
(f) at least one microswitch secured to said frame; and,
(g) microswitch engaging means secured to said securing block at a given spacing from said microswitch such that bending of said beam as a consequence of tension in said rope decreases said given spacing, actual engagement of said microswitch to operate the same occurring when the tension on said rope has reached said predetermined value.

5. A device according to claim 4, including at least one additional microswitch secured to said frame and at least one additional microswitch engaging means secured to said securing block at a spacing from said additional microswitch different from said first mentioned given spacing so that said additional microswitch will be engaged for operation by said additional microswitch engaging means when the tension on said rope has reached a value different from said predetermined value whereby indications of at least two different tensions in said rope can be successively provided by successive operations of the microswitches.

6. A device according to claim 4, in which each of said end mounts includes a flexure web lying in a plane normal to the axis of said beam, the ends of the beam being secured to first portions of the flexure webs, second portions of said flexure webs being secured to said rigid frame so that movement of the ends of the beam towards each other upon bending of the beam at its mid-point is accommodated by the flexure webs.

7. A device according to claim 4, in which said rope receiving cradle structure includes a concave depression in a portion of said securing block juxtaposed to said tangent line; a bridging clamp having an opposed concave depression receivable over said first mentioned concave depression after the mid point of said rope is cradled therein; and fastening screws for securing said bridging clamp to said securing block to thereby clamp the mid point of said rope.

8. A device according to claim 4, in which said bending beam comprises a solid cylindrical bar of given outside diameter, said securing block having a central opening with a radial slot extending from a peripheral point of said opening away therefrom to terminate short of the end of the block, said cylindrical bar passing through said opening, said securing block including a threaded bolt traversing said slot so that tightening of said bolt circumferentially contracts said opening to tightly engage said cylindrical bar.

9. A device according to claim 4, in which said rigid frame comprises two spaced parallel rectangular plates facing each other, said guide pulleys being rotatably mounted between opposed corner portions at opposite ends of the plates, said end mounts being spaced between opposed longitudinal ede portions of the plates adjacent to the remaining corners of the plates at said opposite ends.

10. A device according to claim 4, in which said microswitch engaging means is movable relative to said microswitch and said securing block to enable said given spacing to be varied and thereby change the predetermined value of tension at which said microswitch is operated.

* * * * *